(12) United States Patent
Fallarero et al.

(10) Patent No.: US 12,298,244 B2
(45) Date of Patent: May 13, 2025

(54) METHOD OF ANALYZING SAMPLES, ANALYZING DEVICE AND COMPUTER PROGRAM

(71) Applicant: LIFE TECHNOLOGIES HOLDINGS PTE LTD, Singapore (SG)

(72) Inventors: Adyary Fallarero, Vantaa (FI); Pasi Toivanen, Vantaa (FI)

(73) Assignee: Life Technologies Holdings PTE LTD, Singapore (SG)

( * ) Notice: Subject to any disclaimer, the term of this patent is extended or adjusted under 35 U.S.C. 154(b) by 368 days.

(21) Appl. No.: 17/428,215

(22) PCT Filed: Jan. 31, 2020

(86) PCT No.: PCT/FI2020/050056
§ 371 (c)(1),
(2) Date: Aug. 3, 2021

(87) PCT Pub. No.: WO2020/161384
PCT Pub. Date: Aug. 13, 2020

(65) Prior Publication Data
US 2022/0120687 A1 Apr. 21, 2022

(30) Foreign Application Priority Data
Feb. 4, 2019 (FI) ..................... 20195074

(51) Int. Cl.
*G01N 21/64* (2006.01)
(52) U.S. Cl.
CPC ..... *G01N 21/6452* (2013.01); *G01N 21/6458* (2013.01)
(58) Field of Classification Search
CPC ........... G01N 21/6452; G01N 21/6458; G01N 2021/6484; G01N 21/6456;
(Continued)

(56) References Cited

U.S. PATENT DOCUMENTS

| 4,778,763 A | * | 10/1988 | Makiguchi | ......... | G01N 21/6452 422/65 |
| 6,563,584 B1 | * | 5/2003 | Yurino | ............... | G01N 21/6452 356/417 |

(Continued)

FOREIGN PATENT DOCUMENTS

| CN | 1357104 A | 7/2002 |
| CN | 103748442 A | 4/2014 |

(Continued)

OTHER PUBLICATIONS

International Search Report and Written Opinion issued in PCT/FI2020/050056 dated Apr. 3, 2020.

(Continued)

*Primary Examiner* — Hina F Ayub
(74) *Attorney, Agent, or Firm* — BakerHostetler

(57) ABSTRACT

The method of analyzing samples (3) in the wells (2) of a microplate (1) comprises the steps of producing electromagnetic radiation having a first predetermined wavelength or wavelength range (101), illuminating a sample (3) by said radiation by transmitting the radiation to the sample (3) from above the microplate (1) via the upper end of the well (102), transmitting light emitted by the sample (3) and having a second predetermined wavelength or wavelength range via the upper end of the well (2) to detection means (13) (103), determining intensity of light emitted by one or more predetermined measurement areas (23) of the sample (3) (104), based on the determined intensities, determining a result value representing the total amount of light emitted by the sample (3), and counting the number of spots emitting light having the second predetermined wavelength or wavelength range (106).

17 Claims, 6 Drawing Sheets

(58) Field of Classification Search
CPC ..... G01N 2201/0632; G01N 2201/064; G01N 2201/065
See application file for complete search history.

(56) References Cited

U.S. PATENT DOCUMENTS

| | | |
|---|---|---|
| 2001/0033381 A1 | 10/2001 | Stumbo et al. |
| 2004/0126275 A1 | 7/2004 | Doering et al. |
| 2005/0285129 A1 | 12/2005 | Jackson, III et al. |
| 2007/0177149 A1 | 8/2007 | Aronkyto et al. |
| 2008/0191149 A1 | 8/2008 | Zimenkov et al. |
| 2012/0104280 A1 | 5/2012 | Manian |
| 2012/0308997 A1* | 12/2012 | Ruan ................. G01N 21/6456 435/7.9 |
| 2014/0150517 A1 | 6/2014 | Laitala |
| 2020/0103639 A1* | 4/2020 | Skinner ................. B01L 3/502 |
| 2021/0102959 A1* | 4/2021 | Hrusovsky ........... A61B 5/0075 |

FOREIGN PATENT DOCUMENTS

| | | |
|---|---|---|
| CN | 104105957 A | 10/2014 |
| CN | 104813160 A | 7/2015 |
| CN | 105492890 A | 4/2016 |
| CN | 106662530 A | 5/2017 |
| CN | 106841127 A | 6/2017 |
| CN | 107110851 A | 8/2017 |
| CN | 108474728 A | 8/2018 |
| CN | 108780030 A | 11/2018 |
| CN | 109073554 A | 12/2018 |
| EP | 0841557 | 5/1998 |
| EP | 1804051 | 7/2007 |
| JP | 2005-518553 A | 6/2005 |
| JP | 2010-256077 A | 11/2010 |
| JP | 2010-286566 A | 12/2010 |
| WO | 0063680 A1 | 10/2000 |
| WO | 02/35260 A2 | 5/2002 |
| WO | 03/022999 A2 | 3/2003 |
| WO | WO 2016127128 | 8/2016 |

OTHER PUBLICATIONS

Finnish Search Report issued in U.S. Appl. No. 20/195,074 dated Aug. 30, 2019.
Notice of Reasons for Rejection issued in Japanese Patent Application 2021-545706 dated Dec. 4, 2023, with English translation.
Notice of First Office Action issued in Chinese Patent Application No. 202080011329.1 dated Nov. 9, 2023, with English translation.
Notice of Grant of Patent Right for Invention issued in Chinese Patent Application No. 202080011329.1 dated May 16, 2024, with English translation.
Notice of Reasons for Rejection issued in Japanese Patent Application No. 2021-545706 dated May 28, 2024, with English translation.

* cited by examiner

METHOD OF ANALYZING SAMPLES, ANALYZING DEVICE AND COMPUTER PROGRAM

CROSS-REFERENCE TO RELATED APPLICATIONS

This application is a 35 U.S.C. § 371 nationalization of International Application No. PCT/FI2020/050056, filed Jan. 31, 2020, which claims priority to Finland Patent Application No. 20195074, filed Feb. 4, 2019, the entirety of each of which are incorporated herein by this reference.

TECHNICAL FIELD OF THE INVENTION

The present invention relates to a method of analyzing one or more samples arranged in the wells of a microplate, as defined in claim 1. The invention also concerns an analyzing device and a computer program for operating an analyzing device in accordance with the other independent claims.

BACKGROUND OF THE INVENTION

Assays based on fluorescence are commonly used in life sciences. Fluorescence is a form of luminescence. Fluorescence means emission of light (a photon) by a substance that has absorbed light or other electromagnetic radiation. Absorbance of energy excites an orbital electron of a molecule to a higher electronic state and relaxation to ground state emits a photon.

Fluorescence assays utilize the properties of fluorophores. Fluorophores absorb light energy at one wavelength and, in response, re-emit light energy at another, longer wavelength. Each fluorophore has a distinctive range of wavelengths at which it absorbs light and another distinct range of wavelengths at which it emits light. This property enables their use for specific detection of biological products by analytical instruments and techniques.

In fluorescence assays, the samples are typically arranged in the wells of a microplate. A microplate is a flat plate comprising a plurality of wells, i.e. cavities that are arranged in rows and columns. The wells are configured to receive samples and function as small test tubes. A typical microplate comprises 6, 24, 96, 384 or 1536 wells, although also larger microplates exist.

In a particular type of a fluorescence assay, fluorescent spots are formed, and analysis of the samples is heavily based on counting of the number of the fluorescent spots. A problem related to the counting of the spots is that the counting process strongly relies on the inspection of the spots by a human user with the help of an analyzing device. This makes the analysis time-consuming and highly subjective. An additional problem is that if the number of fluorescent spots in a sample is high, the counting becomes unreliable. For instance, the diameter of the wells in a 96-well microplate is approximately 6 mm. If the number of the spots in one well is for example 500 or more, the spots are so close to each other that reliable counting of the spots becomes difficult.

SUMMARY OF THE INVENTION

An object of the present invention is to provide an improved method of analyzing one or more samples arranged in the wells of a microplate. The characterizing features of the method according to the invention are given in claim 1. Another object of the invention is to provide an improved analyzing device. Still another object of the invention is to provide an improved computer program for operating an analyzing device. The characterizing features of the analyzing device and the computer program are given in the other independent claims.

The method according to the invention comprises the steps of producing electromagnetic radiation having a first predetermined wavelength or wavelength range, illuminating a sample by said electromagnetic radiation by transmitting the electromagnetic radiation to the sample from above the microplate via the upper end of the well, transmitting light emitted by the sample and having a second predetermined wavelength or wavelength range via the upper end of the well to a detector, determining intensity of light emitted by one or more predetermined measurement areas of the sample, and based on the determined intensities of light emitted by said one or more measurement areas, determining a result value representing the total amount of light emitted by the sample and having the second predetermined wavelength or wavelength range.

The analyzing device according to the invention comprises illuminating means for illuminating a sample from above the microplate via the upper end of a well of the microplate using electromagnetic radiation having a first predetermined wavelength or wavelength range, detection means for determining intensity of light emitted via the upper end of the well by one or more measurement areas of the sample and having a second predetermined wavelength or wavelength range, and means that are configured to determine, based on the determined intensities of light emitted by said one or more measurement areas, a result value representing the total amount of light emitted by the sample and having the second predetermined wavelength or wavelength range.

The computer program according to the invention comprises instructions which, when the program is executed by a computer, cause an analyzing device to carry out the method steps defined above.

With the method, device and computer program according to the invention, the analysis of the samples will be less dependent on the judgment of a user. The result value represents an integration or an estimation of the total amount of light emitted by the samples.

According to an embodiment of the invention, the sample comprises a plurality of predetermined measurement areas and the result value is calculated based on determined intensities of light emitted by said plurality of measurement areas.

According to an embodiment of the invention, the measurement areas cover the whole bottom of the well.

According to an embodiment of the invention, for determining the intensity of light emitted by said one or more predetermined measurement areas of the sample, the sample is illuminated using a light beam having a diameter that is at most 60 percent of the diameter of the well.

According to an embodiment of the invention, for determining the intensity of light emitted by said one or more predetermined measurement areas of the sample, one measurement area at a time is illuminated.

According to an embodiment of the invention, a photomultiplier tube is used as the detector for determining the intensity of light emitted by said one or more predetermined measurement areas of the sample.

According to an embodiment of the invention, method comprises the step of counting the number of spots emitting light having the second predetermined wavelength or wavelength range. The method provides high sensitivity and allows fast screening of samples. In addition, compared to mere counting of fluorescent spots, the method offers a wider dynamic signal range, as the method allows measurement even in the case that too large number of fluorescence spots are present making the counting of spots unreliable.

According to an embodiment of the invention, for counting the spots, the whole bottom of the well is illuminated and a camera sensor is used for forming an image of the sample.

According to an embodiment of the invention, the illuminating means comprise a light bulb, LED or laser.

According to an embodiment of the invention, the analyzing device comprises means for selecting the wavelength for illuminating the sample.

According to an embodiment of the invention, the means for selecting the wavelength for illuminating the sample comprise a filter or a monochromator.

According to an embodiment of the invention, the detection means comprise a photomultiplier tube or a silicon photodiode.

According to an embodiment of the invention, the detection means comprise a camera sensor.

According to an embodiment of the invention, for determining the intensity of light emitted by a plurality of measurement areas of the sample, the device is configured to illuminate said measurement areas consecutively one measurement area at a time.

According to an embodiment of the invention, the device is configured to form an image of the sample for counting the number of spots emitting light having the second predetermined wavelength or wavelength range.

According to an embodiment of the invention, for forming an image of the sample for counting the number of spots emitting light having the second predetermined wavelength or wavelength range, the device is configured to illuminate the whole bottom of the well.

According to an embodiment of the invention, the device comprises means that are configured to count the number of spots emitting light having the second predetermined wavelength or wavelength range.

BRIEF DESCRIPTION OF THE DRAWINGS

Embodiments of the invention are described below in more detail with reference to the accompanying drawings, in which.

DESCRIPTION OF EMBODIMENTS OF THE INVENTION

The present invention relates to a method of analyzing one or more samples arranged in the wells of a microplate, to an analyzing device and to a computer program for operating an analyzing device.

In the method according to the invention, intensity of light emitted by a sample is measured. The method can thus be used in fluorescence-based assays, which are commonly used in life sciences.

Fluorescence is a form of luminescence. Fluorescence means emission of light (a photon) by a substance that has absorbed light or other electromagnetic radiation. Absorbance of energy excites an orbital electron of a molecule to a higher electronic state and relaxation to ground state emits a photon.

Fluorescence assays, such as FluoroSpot, utilize the properties of fluorophores. Fluorophores absorb light energy at one wavelength and, in response, re-emit light energy at another, typically longer wavelength. Each fluorophore has a distinctive range of wavelengths at which it absorbs light and another distinct range of wavelengths at which it emits light. This property enables their use for specific detection of biological products by analytical instruments and techniques.

Figure 10:
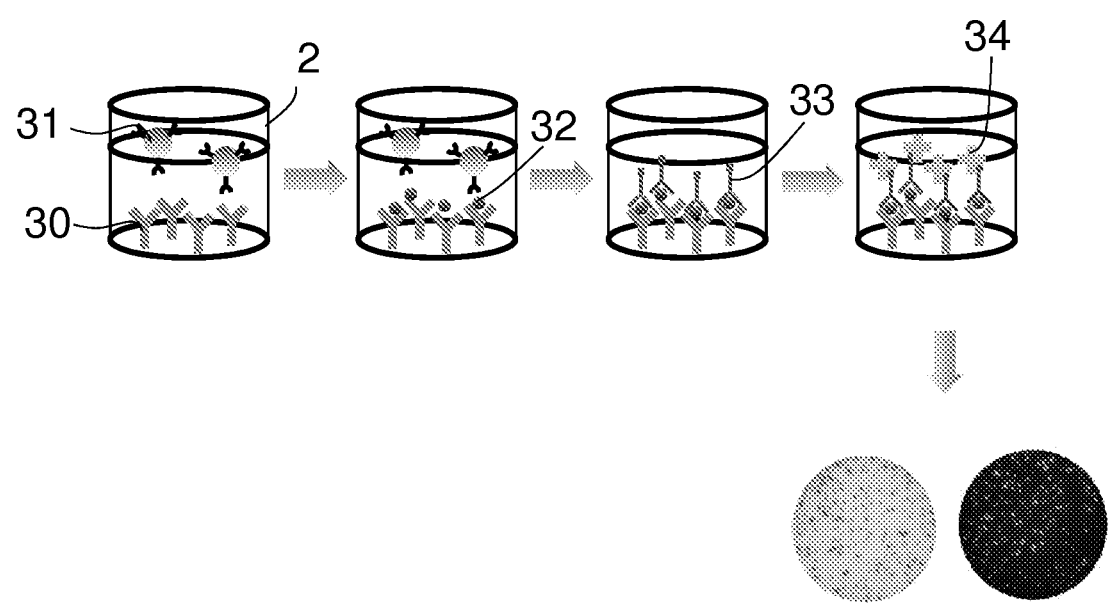
FIG. 10 shows schematically the workflow of an ELISpot/FluoroSpot assay.

FluoroSpot assay is a variant of the commonly used ELISpot assay. FIG. 10 shows a schematic representation of the FluoroSpot/ELISpot assays. FluoroSpot assays can be used for studying immune responses. The bottom of the well 2 of a microplate is provided with a membrane and coated with appropriate antibodies 30 (capture antibodies). Cells 31 are cultured and stimulated in the well 2 to produce analytes 32, which can be for instance cytokines, chemokines or immunoglobulins. Such analytes 32 secreted by the cells 31 are captured by the antibodies 30 bound to the plate. The cells 31 are then removed from the well 2. Fluorescently labelled detection fluorophore antibodies are added to the well 2 to detect the secreted analytes 32. For example biotinylated detection antibodies 33 and streptavidin-enzyme conjugates 34 can be used. Fluorescent spots are thus formed fixed on the membrane on the bottom of the well and these spots can be detected using an analyzing device. The well on the right-hand side illustrates a FluoroSpot assay and the well on the left-hand side illustrates an ELISpot assay. It is assumed that one spot corresponds to one cell that has secreted an analyte. By counting the number of fluorescent spots, it is possible to determine the frequency of antigen-specific T-cells, which is a very relevant parameter in immunological applications.

Figure 4:
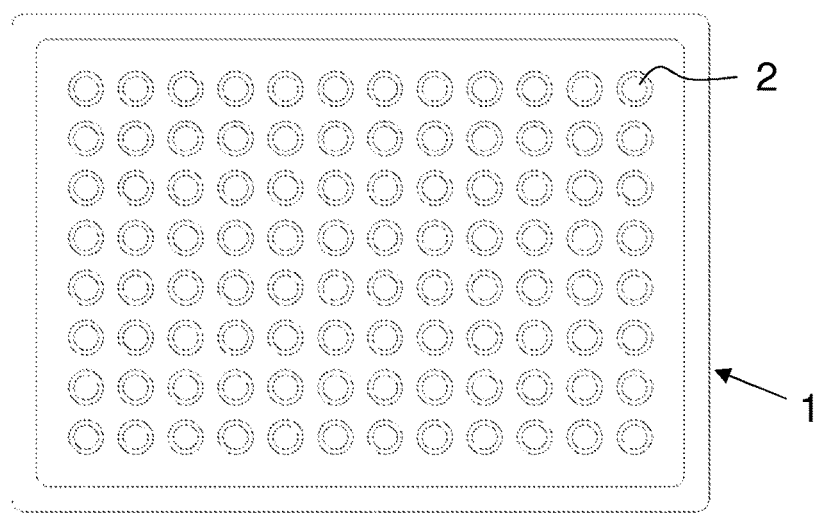
FIG. 4 shows an example of a microplate suitable for use in an analyzing device.

In fluorescence assays, the samples are typically arranged in the wells of a microplate. FIG. 4 shows an example of a microplate 1. A microplate 1 (also called e.g. as a microtiter plate, microwell plate, multiwell plate or multiwell) is a flat plate comprising a plurality of wells 2, i.e. cavities that are arranged in rows and columns. The wells 2 of the microplate 1 are configured to receive samples and they function as small test tubes. A typical microplate comprises 6, 24, 96, 384 or 1536 wells, although also larger microplates exist. The wells 2 are arranged in a rectangular matrix, where the ratio between the sides is typically 2:3. FIG. 4 shows a microplate 1 with 96 wells 2. However, also other microplate sizes could be used in the method and device according to the invention.

Figure 1:
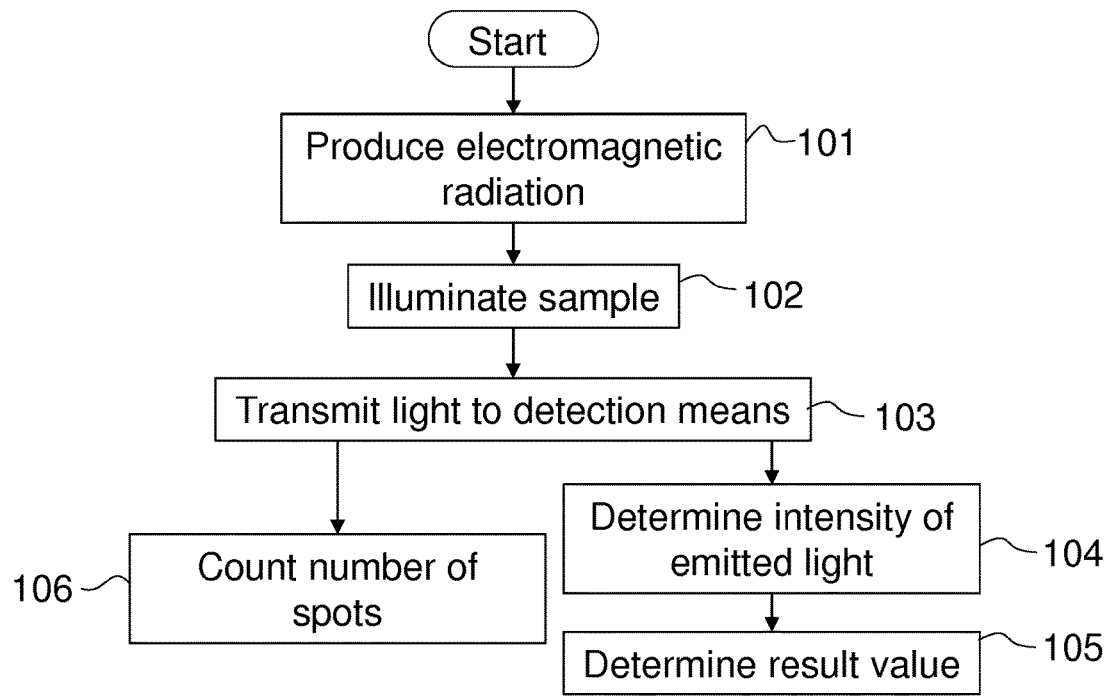
FIG. 1 shows as a flowchart the steps of the method according to an embodiment of the invention.
Figure 5:
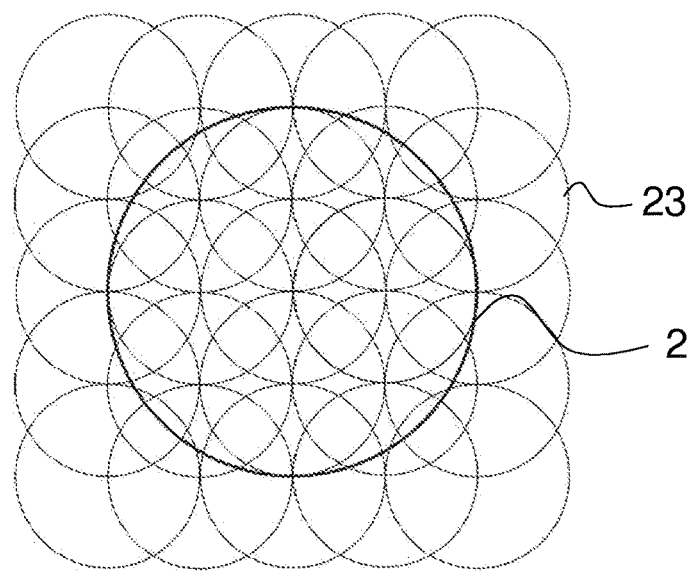
FIG. 5 shows an example of measurement points in a well of a microplate.

FIG. 1 shows the steps of the method according to an embodiment of the invention. In a first step 101 of the method, electromagnetic radiation having a first predetermined wavelength or wavelength range is produced. In a second step 102 of the method, a sample 3 is illuminated by the electromagnetic radiation by transmitting the electromagnetic radiation to the sample 3 from above the microplate 1. In a third step 103 of the method, light emitted by the sample 3 and having a second predetermined wavelength or wavelength range is transmitted via the upper end of the well 2 to a detector or detection means. The second wavelength or wavelength range is different than the first predetermined wavelength or wavelength range. In a fourth step 104 of the method, intensity of light emitted by one or more predetermined measurement areas 23 of the sample 3 is determined. An example of the measurement areas 23 is shown in FIG. 5. In the example of FIG. 5, there are a plurality of measurement areas 23 in the well 2. However, instead of a plurality of measurement areas 23, there could be a single measurement area. The single measurement area could cover the whole bottom of the well 2. In a fifth step 105 of the method, a result value representing the total amount of light emitted by the sample 3 and having the second predetermined wavelength or wavelength range is determined based on the determined intensities of light emitted by the measurement areas 23. A single result value is thus determined for the analyzed sample. The value correlates with the number of fluorescent spots present in the sample. The fifth step 105 is implemented by a computer. The method according to the invention can be carried out by an analyzing device.

The method can further comprise a sixth step 106. In the sixth step 106 of the method, the number of spots emitting light having the second predetermined wavelength or wavelength range is counted. The sixth step 106 is implemented by a computer. The determination of the result value and the counting of the spots do not need to take place in the above-mentioned order, but the spots could also be counted for example before the result value is determined or simultaneously with the fifth step 105 of the method. Either the same detection means or different detection means can be used for the spot counting and for determining the intensity of the emitted light. The sample can be illuminated separately for the spot counting and for determining the intensity of the emitted light. For instance, for the spot counting, the whole bottom of the well can be illuminated at once, whereas for determining the intensity of the emitted light, the sample can be divided into a plurality of measurement areas, one measurement area being illuminated at a time.

A benefit of the method according to the invention is that the analysis is less dependent on the judgment of a user. In addition, compared to the mere counting of fluorescent spots, it offers a wider dynamic signal range, as the method allows measurement even in the case the number of fluorescence spots is too large for reliable counting.

The method according to the invention can be implemented by means of an analyzing device 10. As microplates 1 are typically used for holding samples, such an analyzing device is referred to here as a microplate reader.

Figure 2:
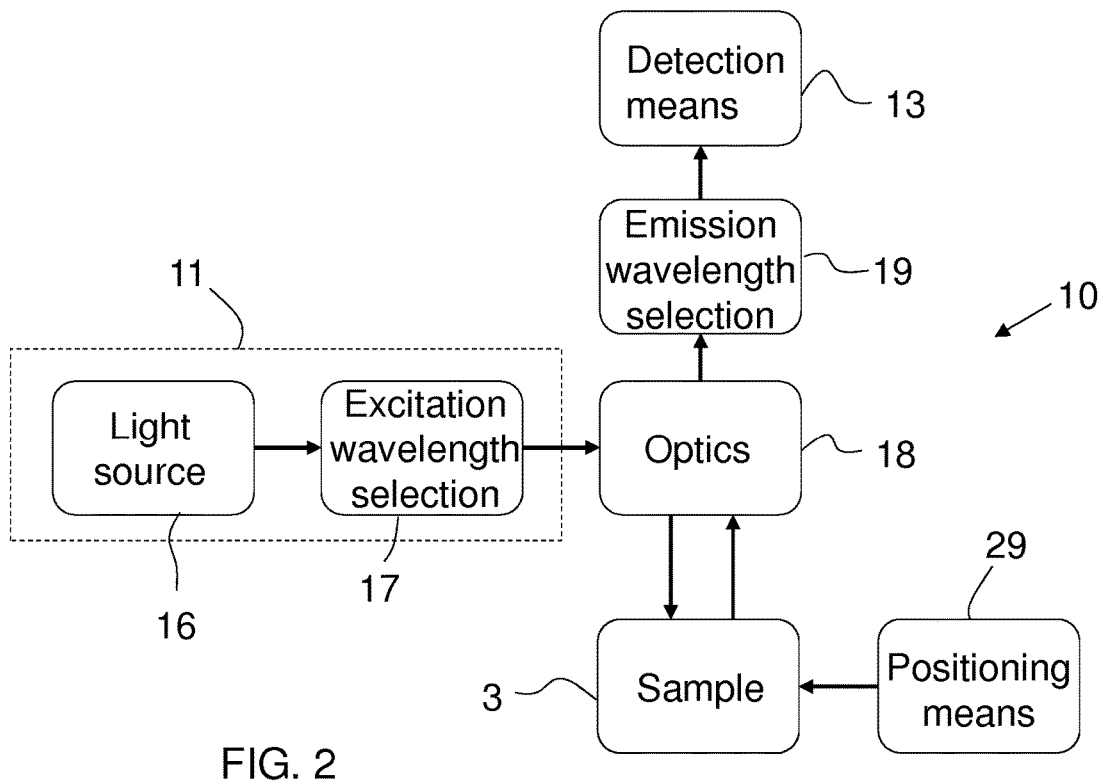
FIG. 2 shows the main elements of an analyzing device suitable for carrying out the method according to the invention.

The main parts of a microplate reader 10 suitable for implementing the method according to the invention are schematically shown in FIG. 2. A microplate reader 10 can detect biological, chemical or physical events of the samples 3 in the microplate 1 (not shown in FIG. 2). The operation of microplate readers can be based on different phenomena, such as absorbance or luminescence. As the method according to the invention is used for fluorescence-based assays, the microplate reader 10 used for implementing the method is configured to measure at least fluorescence. However, the microplate reader 10 could also be a multi-mode reader, which can be used for different assays.

The microplate reader 10 is configured to measure electromagnetic radiation emitted by the samples 3 arranged in the wells 2 of the microplate 1. The microplate reader 10 comprises an illuminating device or illuminating means 11, which are capable of producing electromagnetic radiation with a specific wavelength or wavelength range. The wavelength can preferably be selected by a user of the microplate reader 10. The electromagnetic radiation can be visible light (wavelength range approximately 380-750 nm), ultraviolet light (10-380 nm) or infrared light (750 nm-1 mm). The illuminating means 11 are configured to illuminate the samples 3 in the wells 2 of the microplate 1. One sample 3 or part of a sample can be illuminated at a time, or the microplate reader 10 can be configured to illuminate several samples at a time.

The illuminating means 11 comprise a light source 16, which can be a light bulb, such as a Xenon flash lamp or a halogen lamp. Alternatively, the light source 16 can be a LED or laser. The illuminating means 11 can comprise several light sources, which can be used together, or different light sources can be used for different measurement purposes. In case the illuminating means 11 comprise a laser, light with a specific wavelength can be produced directly. In case the light source 16 produces light with a broader spectrum, the microplate reader 10 can comprise means 17 for selecting the wavelength of the light used for illuminating the sample 3, i.e. an excitation wavelength. The means 17 for selecting the excitation wavelength (excitation wavelength selector) can comprise one or more filters and/or monochromators.

The microplate reader 10 further comprises a detector or detection means 13. The detection means 13 are configured to measure electromagnetic radiation emitted by the sample 3. The detection means 13 can comprise, for instance, a photomultiplier tube, camera sensor or silicon photodiode. The microplate reader 10 can comprise two or more different detection means 13 for different measurements. The detection means 13 are configured to measure the intensity of the light emitted by one or more measurement areas 23 of a sample, as shown in the example of FIG. 5. The detection means 13 can also be used for forming an image of the sample for allowing counting of fluorescent spots.

The microplate reader 10 further comprises illuminating and measurement optics 18. The illuminating optics are configured to focus the electromagnetic radiation from the light source 16 to the sample 3. The measurement optics are configured to focus the light emitted by the sample 3 to the detection means 13. The illuminating optics and the measurement optics can be at least partly the same.

The microplate reader 10 can further comprise means 19 for selecting the emission wavelength to be measured. The means 19 (measurement wavelength selector) can be for example a filter that is arranged before the detection means 13. The wavelength selection means 19 are used for passing through only the wavelengths to be measured. The excitation light can thus be blocked from the detection means 13.

The microplate reader 10 can further comprise a positioning system or positioning means 29 for moving the sample 3 to a measurement position. The positioning means 29 can be configured to move the microplate. Alternatively, the positioning means 29 can be configured to move the detection means 13 and/or to control the illuminating optics and the measurement optics in order to measure fluorescence of a selected sample.

Figure 3:
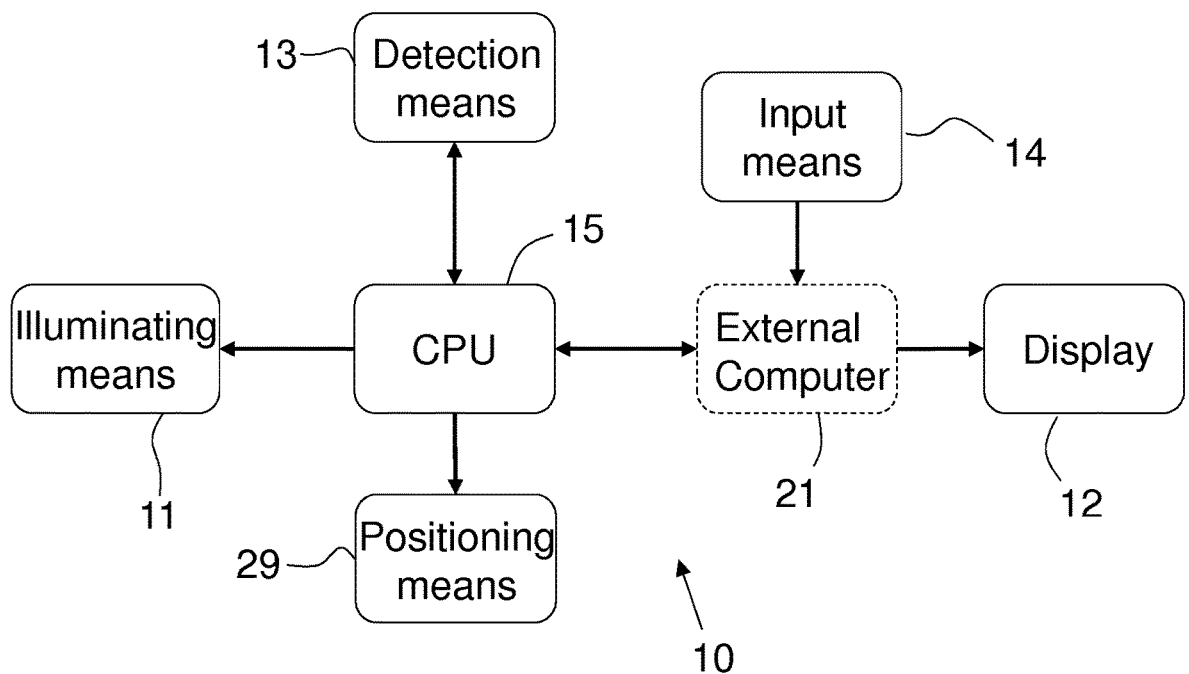
FIG. 3 shows an example of the control system of an analyzing device.

FIG. 3 shows an example of a control system of a microplate reader 10. The microplate reader 10 is controlled via input means 14. The input means 14 can comprise, for instance, operating buttons, a keyboard and/or a touch display. Via the input means 14, the user of the microplate reader 10 can control the operation of the microplate reader 10, adjust parameters, and/or change settings of the microplate reader 10. The results of the analysis can be displayed on a display 12. The display 12 can be an integral part of the microplate reader 10 or an external display connected to the microplate reader 10. The input means 14, illuminating means 11, detection means 13 and display 12 communicate with a central processing unit (CPU) 15. Also the positioning means 29 are controlled by the CPU 15. The input means 14 and the display 12 do not need to be connected directly to the CPU 15. The microplate reader 10 could also be controlled via software that is installed on an external general-purpose computer 21, such as a PC. The input means 14 could thus comprise for example a keyboard that is connected to the external computer 21. Also the display 12 could be connected to the external computer 21. All the connections may be implemented by wire or by any wireless means and the external computer 21 may be a remote server or a cloud server.

When the microplate reader 10 is used for fluorescence assays, the user first sets a desired wavelength for illuminating the samples. The user can select the desired excitation wavelength via the input means 14. The microplate reader 10 may also allow selection of a certain excitation bandwidth, in which case the user can select a certain wavelength range for illuminating the samples. In practice, even if a specific excitation wavelength is selected, the microplate reader 10 is capable of producing electromagnetic radiation with a certain bandwidth. A narrow bandwidth is usually preferred. The acceptable bandwidth depends on the application. In some cases, a bandwidth of 20 nm is sufficient. In some applications, the bandwidth should be at most 10 nm. In some applications, the bandwidth should not exceed 2.5 nm.

Measurement data from the detection means 13 is collected by the CPU 15. The data is used for calculating a result value representing the total amount of light or an estimation of the total amount of light emitted by the sample 3 at a certain wavelength. Either the CPU 15 or an external computer 21 can be used for calculating the result value. The CPU 15 or an external computer 21 can be further configured to count the number of the fluorescent spots.

The microplate reader 10 according to the invention can be configured to both measure electromagnetic radiation emitted by the samples and to form an image of the sample. The microplate reader 10 can therefore comprise both fluorescence measurement means and imaging means. The means used for measuring the fluorescence and for imaging the sample can be at least partly the same, but in the following the means are described separately by referring to FIGS. 6 and 7.

Figure 6:
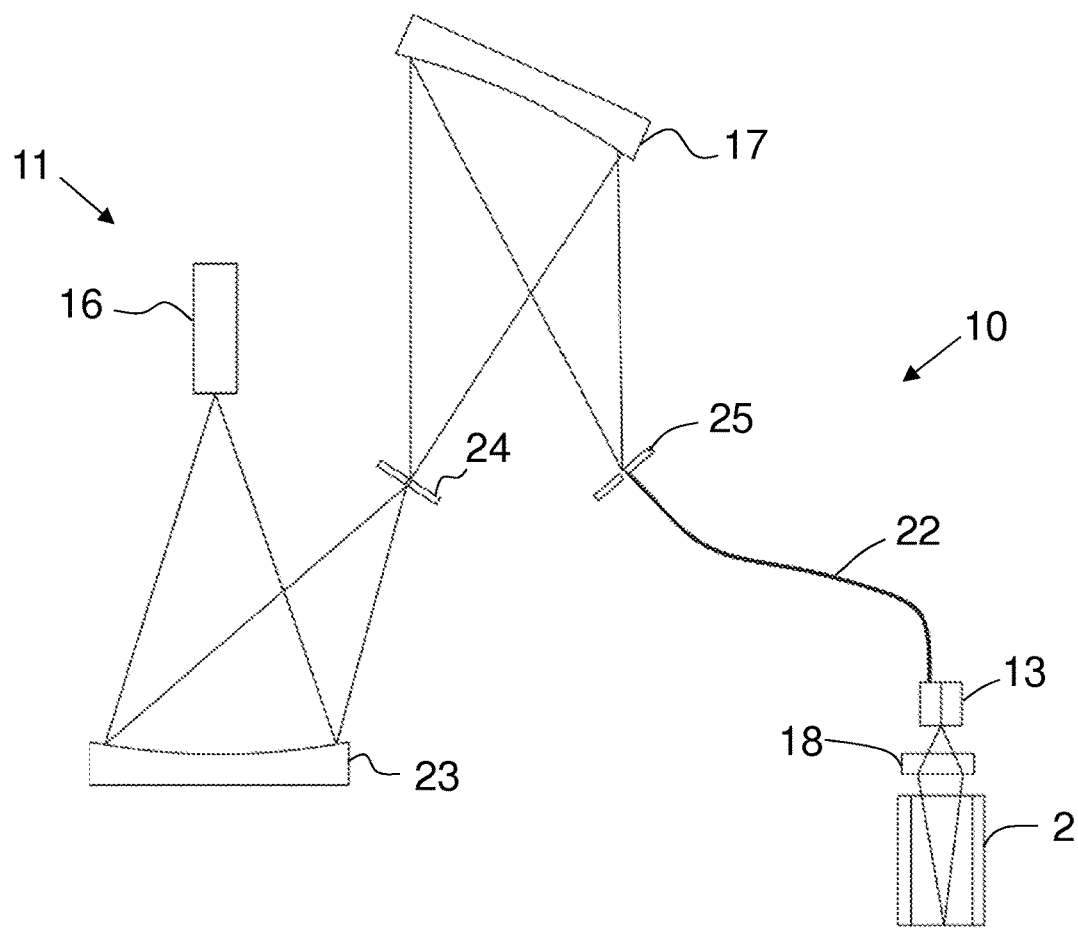
FIG. 6 shows as a schematic view an example of a fluorescence measurement system of an analyzing device.

FIG. 6 shows as a simplified illustration an example of a fluorescence measurement system of a microplate reader 10, which is configured to measure electromagnetic radiation emitted by the samples 3 when excited by the illuminating means 11. In the example of FIG. 6, the illuminating means 11 comprise a light source 16. The light source 16 can be a wide bandwidth lamp, such as a Xenon flash lamp. The light source 16 could also be, for instance, a quartz-halogen lamp.

The light source 16 produces electromagnetic radiation, such as visible light (wavelength range approximately 380-750 nm), ultraviolet light (10-380 nm) or infrared light (750 nm-1 mm) with a broad spectrum. For selecting a specific wavelength, the illuminating means 11 further comprise a monochromator 17. The monochromator 17 produces a light beam with a narrow bandwidth. According to one example, the bandwidth of the light after the monochromator 17 is less than 2.5 nm. However, in some applications also a broader bandwidth is sufficient. Instead of a monochromator, also an interference filter could be used as means for wavelength selection. The light source could also be a narrow band light source, such as a LED or a laser. In that case, a monochromator, interference filter or other external means for wavelength selection may not be needed.

The light beam from the light source 16 is transmitted via optics of the microplate reader 10 to the monochromator 17. In the example of FIG. 6, the optics between the light source 16 and the monochromator 17 comprises a mirror 23 and an entrance slit 24. However, the optics of the microplate reader 10 can be constructed in many different ways.

In the example of FIG. 6, the light is transmitted from the monochromator 17 to the microplate via an exit slit 25 and an optical fiber 22. The light is focused by means of illuminating optics 18 to a sample that is placed in a well 2 of a microplate. The sample is illuminated from above. The intensity of the light emitted by the sample is measured by means of a detector 13, such as a silicon photodiode or a photomultiplier tube. The microplate reader 10 of FIG. 6 is configured for top reading.

A wavelength filter can be arranged between the microplate 1 and the detector 13 to isolate emitted photons from excitation photons. The microplate reader 10 could further comprise emission filters, such as lowpass or bandpass emission filters, before the detector 13 to filter out background fluorescence or to isolate fluorescence signals originating from multiple fluorophores in one sample.

The fluorescence measurement system is preferably configured to measure the intensity of emitted light at a plurality of measurement areas 23 of a sample. However, even a single measurement area could be used. The measurement areas 23 or the single measurement area preferably cover the whole bottom of the well 2 of the microplate 1. The microplate reader 10 can be configured to illuminate one measurement area 23 of the sample 3 at a time. A measurement area 23 is illuminated and the intensity of the light emitted by the area 23 is measured by the detection means 13. The diameter of the light beam used for illuminating the sample can also be, for example, 20-60 percent of the diameter of the well. By using a narrow beam, illuminating intensity can be increased and sensitivity of the measurement can be increased. Based on the measured intensities, a result value is calculated for the sample. In the case of a single measurement area, the result value is based on the measured intensity of the single measurement area.

In the embodiment of FIG. 5, the distance between the center points of two adjacent measurement areas 23 is configured to correspond to the radius of the illuminating beam. For instance, if the diameter of the beam is 3 mm, the beam is moved 1.5 mm between two adjacent measurement areas 23.

Figure 7:
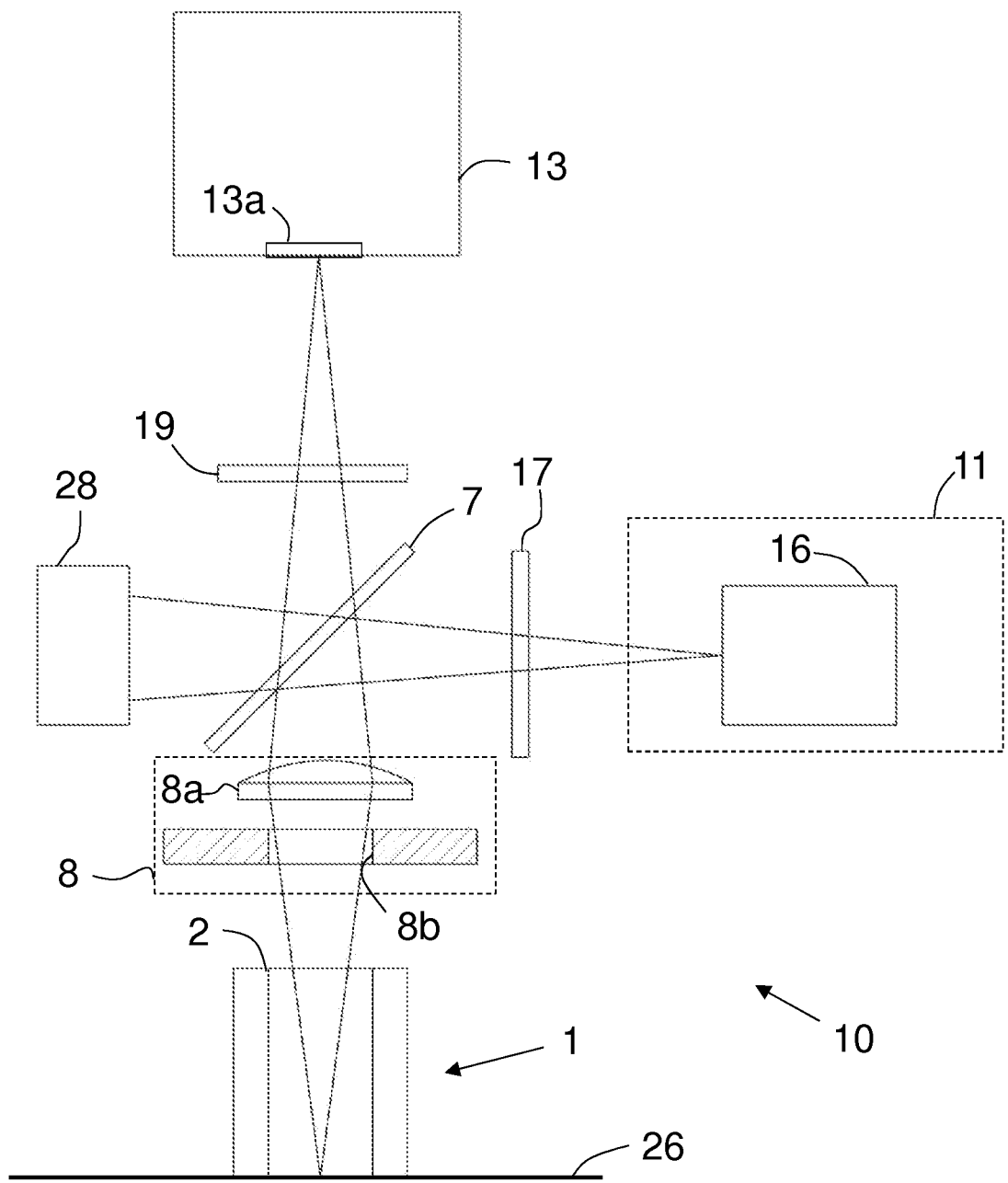
FIG. 7 shows as a schematic view an example of an imaging system of an analyzing device.

The microplate reader 10 further comprises an imaging system for counting the number of fluorescent spots. FIG. 7 shows an example of an imaging system of a microplate reader 10. The imaging system of FIG. 7 is suitable for FluoroSpot and ELISpot assays, but it could also be used for other assays. The microplate reader 10 comprises illuminating means 11. The function of the illuminating means 11 is to produce light, which is used for illuminating the samples in the wells 2 of the microplate 1. In the microplate reader of FIG. 7, one well 2 of the microplate 1 and one sample is illuminated at a time. The illuminating means 11 comprises a light source 16. From the illuminating means 11, the light is directed to a beam splitter 7. The beam splitter 7 is an optical device, which is configured to reflect part of the light and transmit the rest of the light through it. In practice, part of the light received by the beam splitter 7 is absorbed. The beam splitter 7 is arranged to direct the reflected light towards a reading plane 26 of the microplate reader 10. The beam splitter 7 can be made, for instance, of two triangular glass prisms that are glued together. Alternatively, the beam splitter 7 can be a coated glass plate. Beam splitters 7 are available with different properties. The optimal beam splitting ratio for the optical reader is 50-50%, i.e. the amount of light reflected by the beam splitter 7 equals the amount of light transmitted by the beam splitter 7. Half of the light that is not absorbed by the beam splitter 7 is thus reflected and half of the light is transmitted. However, the portion of the reflected light could be, for example, in the range of 40-60 percent.

Between the beam splitter 7 and the reading plane 26, there is arranged a lens system 8 comprising at least one lens 8a. In FIG. 1, only a single lens 8a is shown, but in practice the lens system 8 can comprise several lenses. The lens system 8 is arranged to focus the light received from the illuminating arrangement 11 and the beam splitter 7 to the sample, which is arranged on the bottom of the well 2 of the microplate 1. The lens system 8 further comprises an aperture 8b located between the lenses 8a and the reading plane 26.

The bottom of the well 2 of the microplate 1 and the sample in the well 2 reflect part of the light back towards the lens system 8. In fluorescence measurements, the samples also emit light from the microplate 1 towards the lens system 8. The lens system 8 is configured to focus an image of the sample to an imaging device 13, which functions as the detection means. The same lens system 8 is thus used for focusing the light used for illuminating the sample and for focusing the light received from the microplate 1. The same components thus form both the illuminating optics and measurement optics. From the lens system 8, the light is directed to the beam splitter 7. Part of the light is reflected from the beam splitter 7 towards the illuminating arrangement 11, but part of the light can pass the beam splitter 7 and reach the imaging device 13. If the beam splitting ratio of the beam splitter 7 is 50-50% and absorption by the beam splitter 7 is omitted, half of the light is reflected, and half of the light is transmitted through the beam splitter 7. The imaging device 13 can comprise a digital camera sensor 13a. The imaging device 13 is configured to take one or more images of each sample.

The aperture 8b between the lenses 8a of the lens system 8 and the reading plane 26 is dimensioned to have a diameter that is at most the same as the diameter of the wells 2 of the microplate 3. This eliminates vignette in both the samples and in the imaging device 13. The aperture 8b can be adjustable to allow the microplate reader to be used for analyzing samples in different microplates 1. With the aperture, the size of the illuminated area at the bottom of the well 2 can be adjusted. For instance, in a typical 96-well plate the diameter of the illuminated area could be approximately 6.6 mm and in a 384-well plate 2.5 mm.

The light source 16 can be, for instance, a LED or a group of LEDs. The illuminated area on the bottom of the well 2 of the microplate 1 should cover the whole bottom. The diameter of a typical LED chip is much smaller than the diameter of the wells 2 of the microplate 1. The size of the illuminated area can be affected by the lens system 8. However, it may be beneficial to increase the size of the illuminated area by arranging an integrating sphere, also known as an Ulbricht sphere, around the LED or other light source.

The microplate reader further comprises positioning means (not shown in FIG. 7), which are configured to move the microplate 1. The microplate 1 is moved in the reading plane 26 so that one well 2 at a time is below the lens system 8. An image or several images of the sample is taken and the microplate 1 is then moved so that a next well 2 is below the lens system 8.

The microplate reader of FIG. 7 further comprises a reference detector 28 arranged to measure the intensity of light produced by the illuminating means 11 and transmitted through the beam splitter 7. If a LED is used as the light source 16, the intensity of the LED can change due to heating, which affects the images taken by the imaging device 13. By measuring the intensity of the light, this effect can be taken into account in interpreting the measurement results of the microplate reader.

The microplate reader is further provided with a first filter 17 that is arranged between the illuminating means 11 and the beam splitter 7. The first filter 17 is used in fluorescence assays. The first filter 17 is configured to pass through only that part of the spectrum of the light source 16 that is needed for exciting the samples. The first filter 17 is thus used as the means for selecting the excitation wavelength. A second filter 19 is arranged between the beam splitter 7 and the imaging device 13. Like the first filter 12, also the second filter 19 is used in fluorescence assays. The second filter 19 is configured to pass through light consisting of wavelengths emitted by the samples.

In the embodiment of FIG. 7, the imaging device 13 is arranged directly above the lens system 8. The illuminating means 11 are arranged in the same horizontal plane with the beam splitter 7. The light from the illuminating means is thus reflected to the microplate 1 and the light from the microplate 1 is transmitted through the beam splitter 7. This arrangement allows the use of the reference detector 28 without disturbing the illumination of the sample. However, it would also be possible to switch the places of the imaging device 13 and the illuminating means 11. The light used for illuminating the samples could thus pass the beam splitter 7 and the image of the sample could be reflected by the beam splitter 7 to the imaging device 13.

An image formed by the imaging system can be used for counting fluorescent spots of a sample. The central processing unit 15 of the microplate reader 10 or an external computer 21 can thus be configured to determine the number of fluorescent spots in a sample.

A microplate reader 10 according to the invention can thus comprise both a fluorescence measurement system, such as the system of FIG. 6, and an imaging system, such as the system of FIG. 7. The microplate reader 10 can thus be configured to measure the intensity of light emitted by a sample and to form an image of the sample. This allows a more comprehensive analysis of the sample. Part of the components of the fluorescence measurement system and the imaging system can be the same. For instance, the same light source 16 could be used in both systems. Also the measurement optics and illuminating optics could be at least partly the same for both measuring the intensity of the emitted light and for imaging the sample. An imaging system could also be used for measuring the fluorescence. The intensity of emitted light could be determined by means of the camera sensor 13a, and a separate system for measuring the intensity of the emitted light would thus not be needed.

Figure 8:
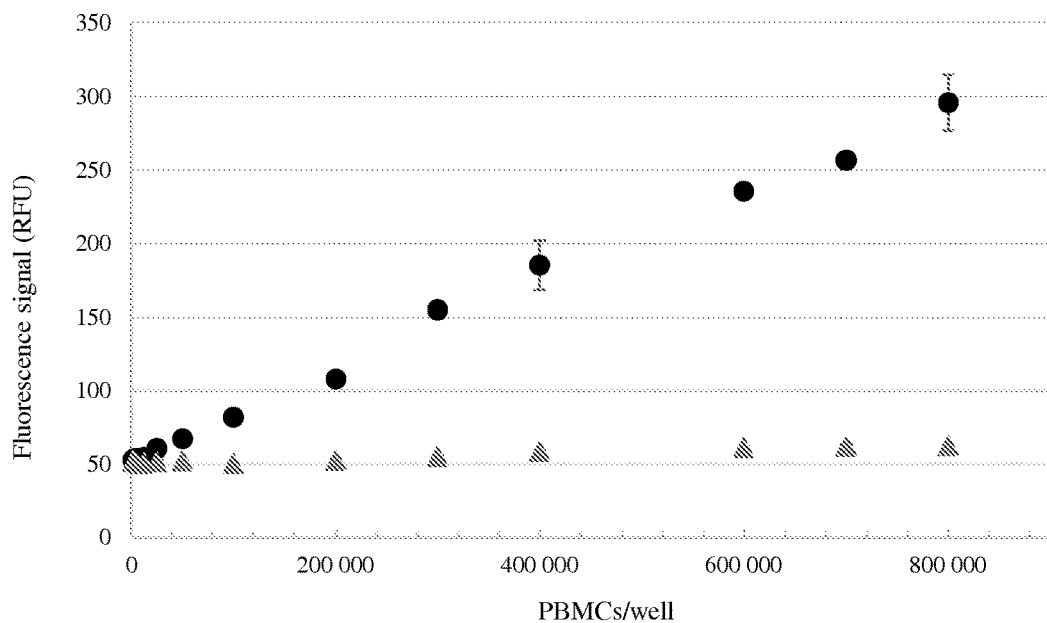
FIG. 8 shows an example of the measurement results of a fluorescence assay obtained by the method according to the invention.
Figure 9:
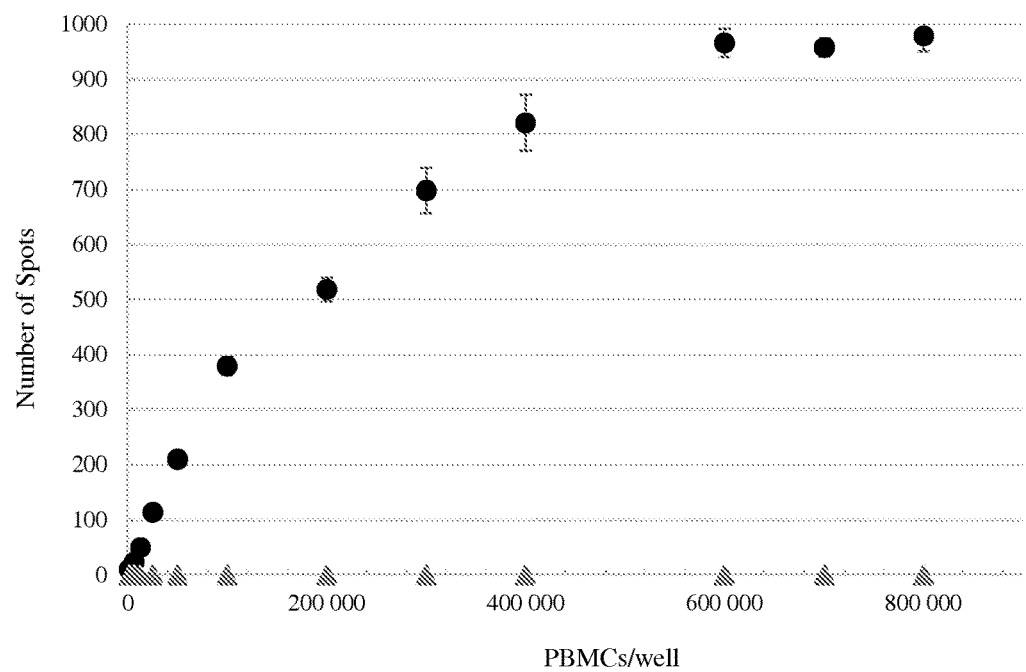
FIG. 9 shows the spot counting results based on the same assay as FIG. 8.

FIGS. 8 and 9 show an example of the results obtained by the method according to an embodiment of the invention. The method was applied to a sample placed in a well of 96-well microplate, where the diameter of the bottom of the well is 6 mm. The diameter of the light beam used for illuminating the sample was 3 mm. The measurement areas were located as shown in FIG. 5. The measurement areas thus formed a matrix comprising five rows and five columns. The light beam was moved 1.5 mm at a time. FIG. 8 shows the results from the step of determining the intensity of the emitted light and FIG. 9 shows the results obtained by the spot counting step. On the X-axis in both figures is shown the amount of Antigen Presenting Cells, in this case human peripheral blood mononuclear cell (PBMCs), (amount of PBMCs/well). FIG. 8 shows on the Y-axis a fluorescent result value, which has been calculated based on the measured intensities of light emitted at a wavelength of 520 nm at a plurality of measurement points. The wavelength of the excitation light has been 480 nm. FIG. 9 shows on the Y-axis the number of spots counted from the sample. In both cases, the number of IFN-γ producing cells is measured. The upper dots in FIGS. 8 and 9 represent stimulated samples and the lower dots represent blanks (unstimulated samples).

The multipoint fluorometric readout increases linearly throughout the entire range of cellular concentrations (at low and very high levels of cytokine production), while the spot number increases almost linearly up to plateau, which coincides with the maximum number of detectable spots per well. This is due to the intrinsic limitation of the image-based methods to resolve spots from the background when spots become too crowded on the wells. On the other hand, the limit of detection of the spot counting method is better than the one based on the fluorescence intensity measurement. Therefore, by combining both readouts it is possible to preserve the low detection limit of the spot counting method while expanding the dynamic range of the assay. For instance, it is conceivable that predictions can be made of the frequency of antigen-positive cells, at high frequency values, using the measured fluorescence signal instead of the spot counting, which is unreliable in such cases.

The method according to the invention can be used for instance for fast screening of microplates. The method allows identifying of samples that should be taken to further analysis. The method is beneficial especially when the number of fluorescent spots is too high for counting of the single spots. The combination of spot counting and the calculation of a fluorescence signal provides a comprehensive solution to FluoroSpot data analysis and allows troubleshooting in case the counting of spots fails.

It will be appreciated by a person skilled in the art that the invention is not limited to the embodiments described above, but may vary within the scope of the appended claims.

The invention claimed is:

1. A method of analyzing one or more samples arranged in the wells of a microplate, the method comprising the steps of:
   producing electromagnetic radiation having a first predetermined wavelength or wavelength range,
   illuminating a sample by said electromagnetic radiation by transmitting the electromagnetic radiation to the sample from above the microplate via an upper end of a well,
   transmitting light emitted by the sample and having a second predetermined wavelength or wavelength range via the upper end of the well to a detector,
   determining an intensity of light emitted by a plurality of predetermined measurement areas of the sample,
   based on the determined intensities of light emitted by said plurality of measurement areas, determining a result value representing the total amount of light emitted by the sample and having the second predetermined wavelength or wavelength range, and
   counting the number of spots in the sample emitting light having the second predetermined wavelength or wavelength range.

2. A method according to claim 1, wherein the result value is calculated based on determined intensities of light emitted by said plurality of measurement areas.

3. A method according to claim 1, wherein the plurality of measurement areas cover the whole bottom of the well.

4. A method according to claim 1, wherein, for determining the intensity of light emitted by said plurality of predetermined measurement areas of the sample, the sample is illuminated using a beam having a diameter that is at most 60 percent of the diameter of the well.

5. A method according to claim 1, wherein, for determining the intensity of light emitted by said plurality of predetermined measurement areas of the sample, one measurement area at a time is illuminated.

6. A method according to claim 1, wherein a photomultiplier tube is used as the detector for determining the intensity of light emitted by said plurality of predetermined measurement areas of the sample.

7. A method according to claim 1, wherein, for counting the spots, the whole bottom of the well is illuminated and a camera sensor is used for forming an image of the sample.

8. A computer program for operating an analyzing device, the computer program comprising instructions which, when the program is executed by a computer, cause an analyzing device to carry out the method according to claim 1.

9. An analyzing device that is configured to receive a microplate comprising a plurality of wells, each of the wells being configured to receive a sample, wherein the analyzing device comprises:
   an illuminator for illuminating a sample from above the microplate via an upper end of a well of the microplate using electromagnetic radiation having a first predetermined wavelength or wavelength range,
   a detector configured for determining an intensity of light emitted via the upper end of the well by a plurality of measurement areas of the sample and having a second predetermined wavelength or wavelength range,
   the device being configured to count the number of spots emitting light having the second predetermined wavelength or wavelength range, and
   the device being configured to determine, based on the determined intensities of light emitted by said plurality of measurement areas, a result value representing the total amount of light emitted by the sample and having the second predetermined wavelength or wavelength range.

10. An analyzing device according to claim 9, wherein the illuminator comprises any one or more of a light bulb, LED or laser.

11. An analyzing device according to claim 9, further comprising at least one of a filter and a monochromator for selecting the wavelength for illuminating the sample.

12. An analyzing device according to claim 11, comprising a filter for selecting the wavelength for illuminating the sample.

13. An analyzing device according to claim 9, wherein the detector comprises a photomultiplier tube or a silicon photodiode.

14. An analyzing device according to claim 9, wherein the detector comprises a camera sensor.

15. An analyzing device according to claim 9, wherein, for determining the intensity of light emitted by a plurality of measurement areas of the sample, the device is configured to illuminate said measurement areas consecutively one measurement area at a time.

16. An analyzing device according to claim 9, wherein the device is configured to form an image of the sample for counting the number of spots emitting light having the second predetermined wavelength or wavelength range.

17. An analyzing device according to claim 16, wherein, for forming an image of the sample for counting the number of spots emitting light having the second predetermined wavelength or wavelength range, the device is configured to illuminate the whole bottom of the well.

* * * * *